April 5, 1966  F. D. LAKINS ETAL  3,244,042
CLAMP APPARATUS

Filed Jan. 16, 1964　　　　　　　　　　　　　　　8 Sheets-Sheet 1

FIG. 1

INVENTORS.
FRANKLIN D. LAKINS.
GERALD B. LANPHERE.
BY
D. Emmett Thompson
THEIR ATTORNEY.

INVENTORS.
FRANKLIN D. LAKINS.
GERALD B. LANPHERE.
BY
D. Emmett Thompson

THEIR ATTORNEY.

FIG. 6

INVENTORS.
FRANKLIN D. LAKINS.
GERALD B. LANPHERE.
BY
D. Emmett Thompson
THEIR ATTORNEY.

April 5, 1966  F. D. LAKINS ETAL  3,244,042
CLAMP APPARATUS
Filed Jan. 16, 1964  8 Sheets-Sheet 8

FIG. 9

INVENTORS.
FRANKLIN D. LAKINS.
GERALD B. LANPHERE.
BY
D. Emmett Thompson
THEIR ATTORNEY.

{ # United States Patent Office 3,244,042
Patented Apr. 5, 1966

3,244,042
CLAMP APPARATUS
Franklin D. Lakins, Syracuse, and Gerald B. Lanphere, Central Square, N.Y., assignors to Lipe-Rollway Corporation, Syracuse, N.Y., a corporation of New York
Filed Jan. 16, 1964, Ser. No. 338,226
4 Claims. (Cl. 83—157)

This invention is directed to and has as an object a new and improved clamping apparatus for use in conjunction with a bar working machine.

It is desirable in high speed production work to automatically feed the bar stock out of which the bar pieces are to be made into the bar working machine. Such an automatic feed is termed a bar feed machine, and may be of the type disclosed in Patent No. 3,092,288, issued June 4, 1963.

One particular use of such a bar feed machine is in conjunction with a cut-off machine of the type disclosed in Patent No. 2,836,015, issued May 27, 1958. In such a use, the bar feed machine is aligned with the cut-off machine, so as to feed the bar stock to and past the cut-off tool, which may comprise a circular saw. Such an arrangement is utilized where it is desired to obtain work pieces out of bar stock having a uniform cross-sectional area and configuration wherein the work pieces are to be of predetermined axial length. Accordingly, the bar stock is fed into engagement with a stop located behind the cut-off tool, and the cut-off tool is then operated to part the work piece from the bar stock. Because of the necessity for high speed in such a manufacturing operation, it is necessary that the feeding and positioning of the work piece portion of the bar stock, and the parting thereof from the bar stock take place in a minimum amount of time. As will therefore be obvious, it is necessary that the operation be completely mechanized in order to reduce the cycle length to a minimum.

Accordingly, as a more specific object of the invention a new and improved clamping device is provided in which the clamping device operates in timed relation to a bar feeding and bar working machine set-up, so that the clamping device is in the open position during the feeding portion of the cycle, after which the bar is clamped while the work piece is parted from the bar and thereafter the parted work piece is discharged from the clamp, which is reopened to permit the further infeed of the bar and commences a new cycle.

More specifically, it is an object of the invention to provide a new and improved clamping device comprising first and second vises operable to clamp a bar and work piece forming portion thereof on opposite sides of a parting tool, and means for clamping and unclamping said vises in timed relation to the feed of the bar and the parting of the work piece.

It is an additional object of the invention to provide a device of the character described, wherein means are provided for moving the vises axially in relation to each other to provide tool relief for the parting tool.

It is a further object of the invention to provide a control system for a clamping device of the character described which will serve to clamp and unclamp the vises, move the vises, discharge the work pieces and discharge the bar end remnant according to a predetermined order.

Briefly described, the preferred embodiment of the invention is used in conjunction with an automatic magazine loading bar feed set-up to feed bar stock to and past a circular cut-off saw mounted on an oscillating arm, and into engagement with a work stop. A pair of vises are located in side by side relation on the saw table and in the path of travel of the bar stock. Each vise has a forward jaw which serves as a relief surface, and an adjustable rear jaw to accommodate bar stock of different sizes. A pivotal work supporting table or vise floor is located beneath the jaws, and the vises are mounted on guide rods for movement axially with reference to the bar stock, toward and away from each other, so as to provide tool relief for the saw. The control system functions to operate the clamping apparatus as follows:

(a) The vise jaws are open with the vise floors in the supporting position;

(b) The bar feed machine moves the bar stock through the jaws on the floors into engagement with a work stop;

(c) The saw arm commences travel from its upward position and the vise jaws are actuated to clamp the bar stock on either side of the path of travel of the saw;

(d) The saw completes the cutting of the bar stock and the vises are separated to provide a tool relief;

(e) As the saw arm moves upwardly, the work piece vise jaws are unclamped and the vise floor oscillated to discharge the work piece;

(f) As the saw arm reaches its uppermost position, the bar vise unclamps to release the stock bar;

(g) The bar is fed forwardly toward the work stop and the vises are repositioned for the next cycle.

In addition, when the last good piece has been cut or parted from the bar stock, the location of the feed mechanism in the bar feed machine is witnessed, and as it moves rearwardly in the bar feed machine, the work piece vise and the bar stock vise are unclamped and their respective floors pivoted to discharge the bar end remnant.

The invention consists in the novel features and constructions and the method hereinafter set forth and claimed.

In describing the invention, reference is had to the accompanying drawings in which like characters designate corresponding parts in all the views.

Figure 1:
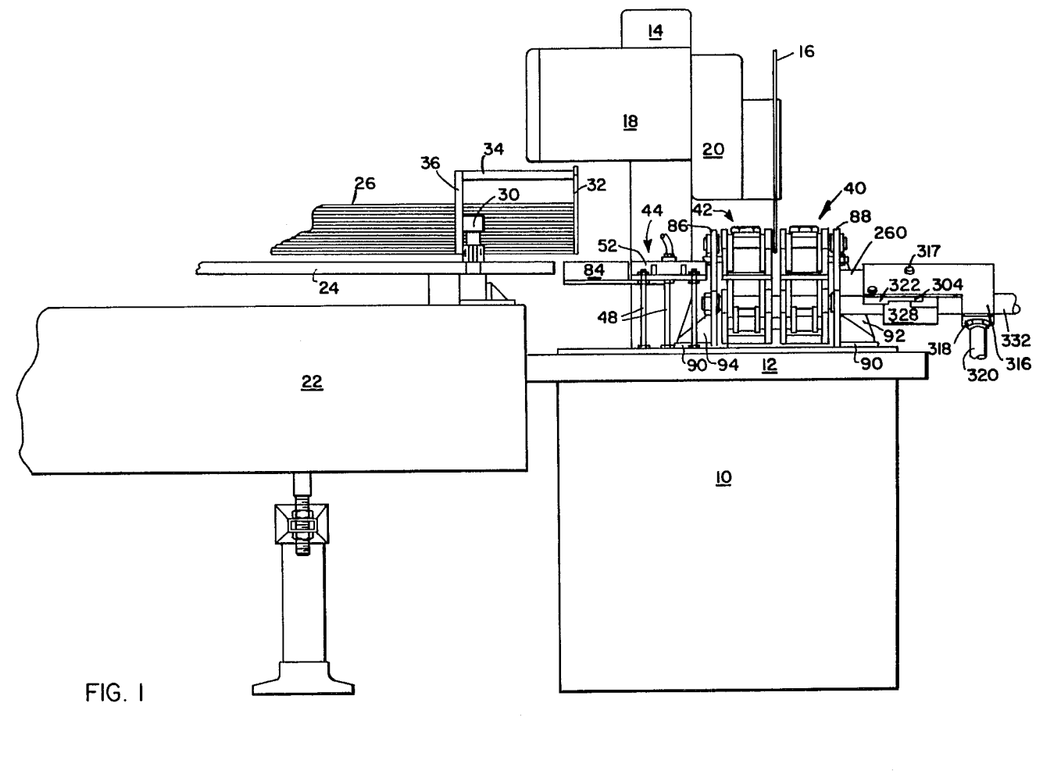
FIGURE 1 is a front elevational view showing the preferred embodiment of the invention in conjunction with a bar feed, and bar working machine set-up.

Referring first to FIGURE 1, the bar feed machine set-up is shown as comprising a cut-off saw having a base 10 and a table 12. This machine may be of the type shown in Patent 2,836,015 and includes an oscillating arm 14 which carries the circular saw 16, which is driven by a motor 18 through a gear reduction box 20, which are mounted on the arm 14. The bar feed machine is indicated at 22 and is of the automatic magazine loading type, as shown in Patent No. 3,092,288, and includes a bar feed tube 24, into which is fed successively the pieces of bar stock, indicated at 26 by a magazine feed device 30. The bar feed includes an end plate 32 supported by the arms 34 and 36 to properly position the bar ends for feeding into the tube 24.

Figure 2:
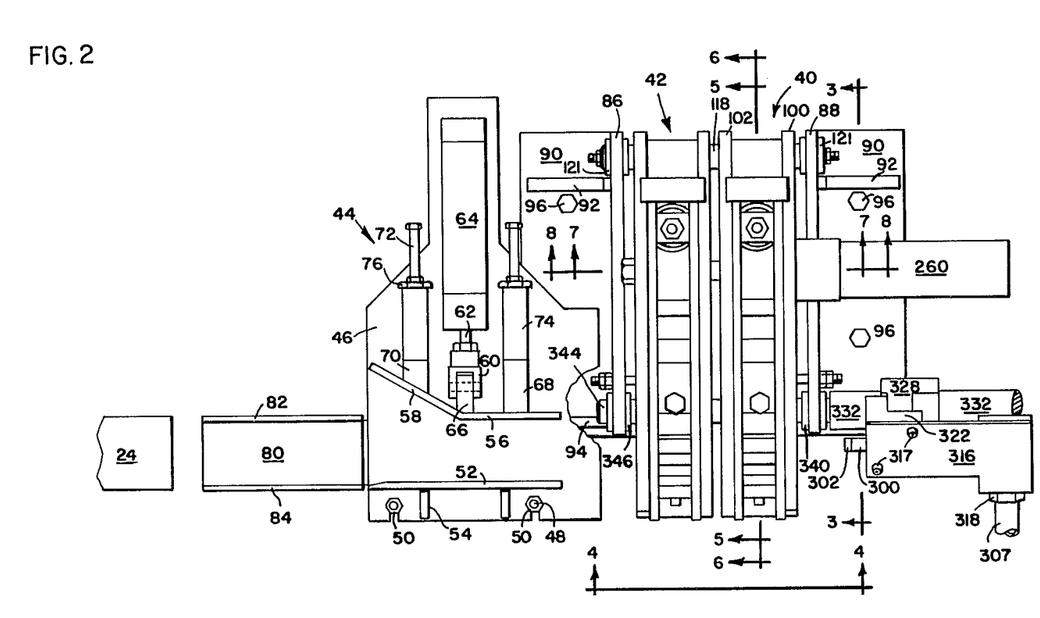
FIGURE 2 is a plan view of the clamping mechanism shown in conjunction with a guide mechanism to properly guide the bar stock into the clamping mechanism.

Referring now to FIGURES 1 and 2, the clamp mechanism comprises a work piece vise, generally indicated
} by the reference numeral 40, and a bar stock vise, generally indicated by the reference numberal 42. The bar stock is guided for feed into the clamping apparatus by means of a locater device, generally indicated by the reference numeral 44.

The locater device comprises a base plate 46 supported by means of bolts 48 (see FIGURE 1) and nuts 50 on the saw table 12. The base plate is provided with an upstanding crosswise extending fixed outer wall 52, which is affixed to the base by a pair of welded gusset plates 54. A movable wall 56 having a rearwardly angularly extending portion 58 is located a spaced distance away from the fixed wall 52, and is connected to a clevis 60 fixed on the rod 62 of a cylinder 64 by means of an apertured boss 66 affixed to rear face of wall 56. The rear of the side wall 56 is provided with a pair of rearwardly extending bosses 68 and 70 which are provided with tapped apertures to receive the threaded inner ends of bolts 72. The bolts 72 pass through a pair of upstanding apertured bosses 74 which are affixed to the base plate 46, and which have been provided with a pair of apertured externally threaded bolts 76. The cylinder 64 may be actuated to adjust the position of the side wall 56, which movement is guided by the movement of the bolts 72 through the bolts 76 and bosses 74, and the position of bolts 76 in the bosses 79 may be axially adjusted, all whereby to adjust the opening between the walls 52 and 56 to accommodate bar stock of different diameters. Finally, the locater base is provided with an extension channel comprising a base 80 and side walls 82 and 84 to bridge the gap between the leading edge of the base 46, and the end of the stock bar feed tube 24.

Referring to FIGURES 1 through 4, inclusive, the clamping apparatus is made up of left and right hand brackets 86 and 88. Each of the brackets is provided with a base portion 90, which is affixed to upstanding portion 86, 88 by a welded rearwardly located gusset plate 92 and a forwardly located gusset plate 94. The base 90 is fixed to the saw table 12 by any suitable means, such as threaded bolts 96. Mounted between the brackets 88 and 86 are the work piece vise 40 and the stock bar vise 42. These vises are identical in all respects with the exception of one being right hand and the other left hand and accordingly, only one of the vises will be completely described.

Figure 3:
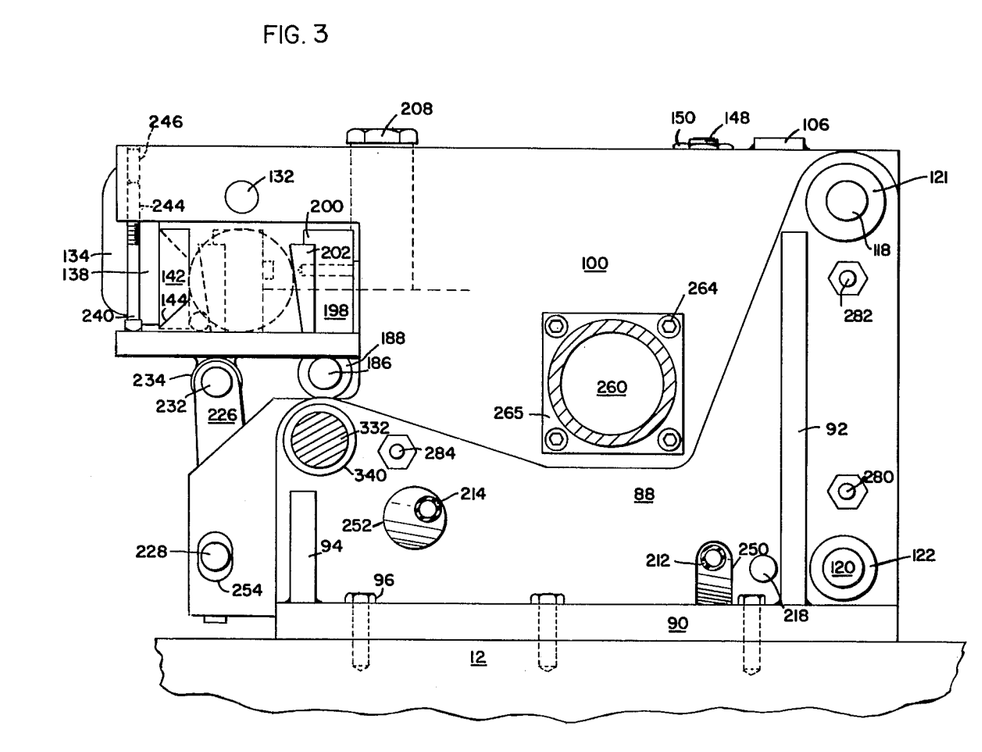
FIGURE 3 is a side elevational view taken looking in the direction of arrows 3—3 on FIGURE 2.
Figure 4:
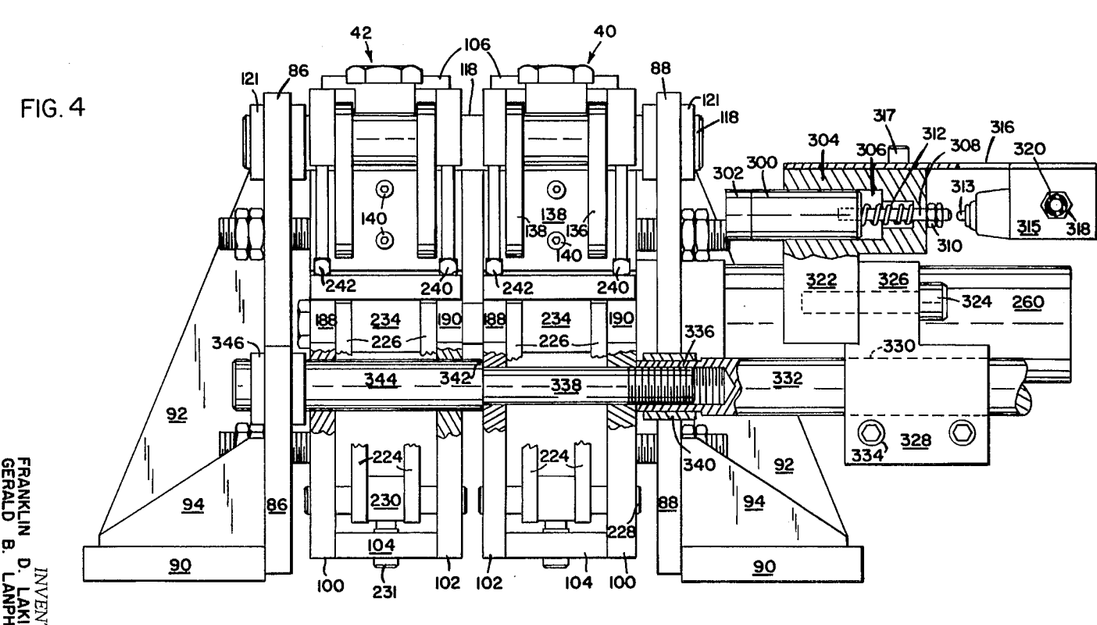
FIGURE 4 is a view taken looking in the direction of arrows 4—4 of FIGURE 2, with parts broken away and parts in section.

In FIGURE 4, it will be seen that the work piece vise 40 is comprised of a vise frame made up of side plates 100, 102, which are spaced a fixed distance apart by cross pieces 104, which are welded or affixed by any suitable means to the plates 100, 102. The configuration of the plates 100, 102 is best seen by referring to FIGURES 3, 5 and 6, wherein the configuration of the plates is clearly shown. The upper edges of the plates 100, 102 are fixed a spaced distance apart by a cross strap 106 welded or otherwise suitably affixed to the plates 100, 102.

Carried by the plates 100 and 102, and suitably fixed therebetween are two bushings 108, and 110. Received in the bushings 108, and 110 are guide rods 118, and 120. The outer ends of the rods 118 and 120 are fixedly received in bushings 121 and 122, fixedly mounted in the plates 86 and 88, all whereby to permit movement of the vises on the rods for a purpose to be hereinafter described.

Figure 5:
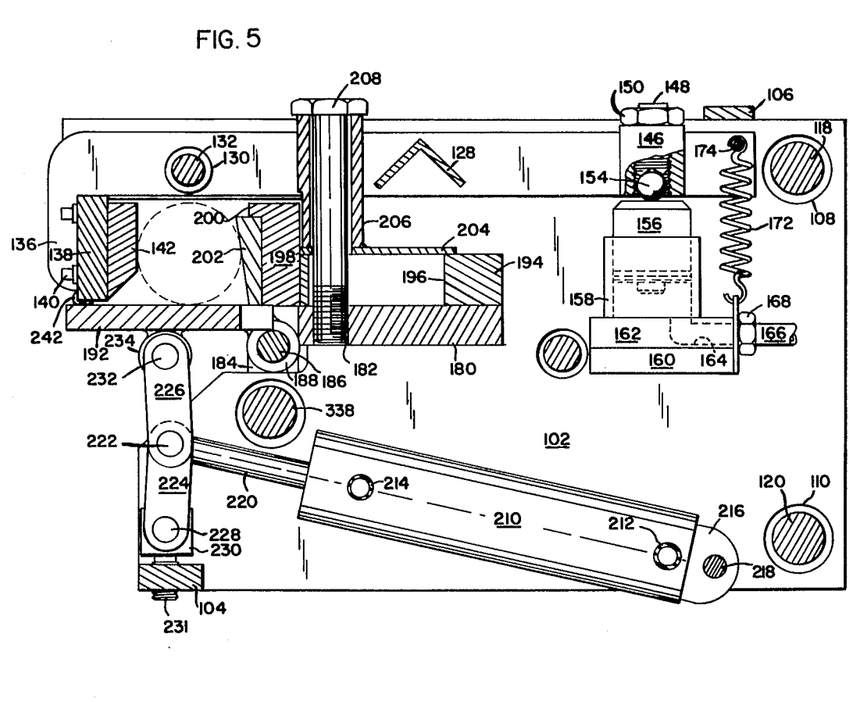
FIGURES 5 and 5 are views taken looking in the direction of the arrows 5—5 and 6—6 on FIGURE 2, showing the work piece vise in two positions of operation.
Figure 6:
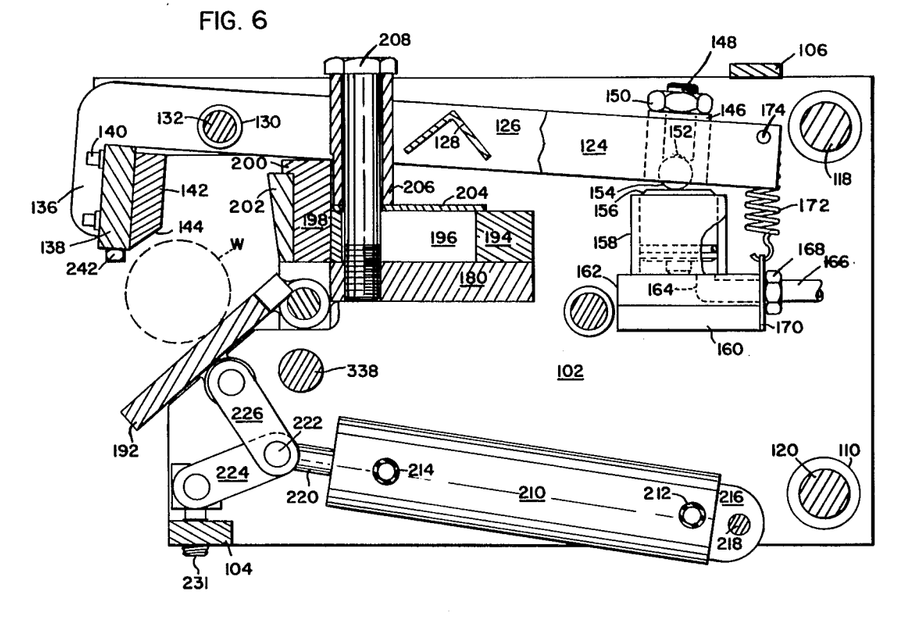

Referring to FIGURES 5 and 6, a movable vise jaw is carried between the side plates 100 and 102 of the vise 40, and is made up of a pair of arms 124 and 126 fixed a spaced distance apart by an angle spacer arm 128 welded, or otherwise suitably affixed between the arms. The forward portion of the arms 124 and 126 carry a bushing 130, suitably affixed therebetween, through which is received a pivot pin 132, the outer ends of which are fixed between the plates 100 and 102 of the frame of work piece vise 40.

As best seen in FIGURES 4, 5 and 6, the forward ends of the arms 124 and 126 extend downwardly in a direction perpendicular to the lengths of the arms and these portions are identified by reference numerals 134 and 136. Welded, or otherwise suitably affixed to the inner face of the portions 134 and 136 is a vise jaw mounting plate 138, and the plate 138 is provided with a pair of apertures through which pass a pair of bolts 140 to fix the jaw 142 to the jaw mounting plate 138, the bolts 140 being received in suitably tapped apertures formed in the jaw 142. As best seen in FIGURE 6, the lower edge of the jaw 142 is beveled as at 144 to provide clearance for the work piece W, shown in phantom lines, FIGURE 6, when the work piece is discharged from the vise. With work pieces W of smaller diameter the jaw 142 is reversed (as shown in dotted lines in FIGURE 3) so that the beveled portion 144 is located at the top thereof, as there is no need to provide clearance for the discharge of small diameter work pieces.

Located between the inner ends of the arms 124 and 126, and fixedly attached thereto is a block 146, in which is received a threaded pin 148, the pin 148 threadingly engaging a tapped aperture formed in the block 146 and being adjustably positioned in the block by means of a nut 150. The inner end of the pin 148 is formed with a V-notch 152, in which is received a ball 154, which is engaged on its under surface by the rod 156 of a cylinder 158.

The cylinder 158 is supported between the side plates 100 and 102 of the vise frame on a shelf 160 and the lower end of the cylinder 158 is affixed to a block 162, which in turn is suitably affixed in any manner to the shelf 160. The block 162 is bored to provide an air passage 164 to the bottom of the cylinder 158 and is connected to an air line 166 by a threaded connecting fitting 168. The rearward end of the block 164 is provided with a plate 170 affixed thereto in any suitable manner, and the plate 170 extends upwardly above the top surface of the block 162 and is apertured to receive the end of a tension spring 172. The opposite end of the spring 172 passes between the inner ends of the movable vise jaw arms 124 and 126, and over a pin 174 carried therebetween, so as to normally bias the movable vise jaw to the position shown in FIGURE 6. As will be obvious, when air pressure is introduced into the lower end of the cylinder 158, the rod 156 moves upwardly and through the ball 152 and pin 148 carried in the block 146, the movable vise jaw is moved against the force of the spring 172 into the clamping position shown in FIGURE 5.

Carried between the side plates 100 and 102 of the vise frame is a forward supporting shelf 180, which is provided adjacent its forward end with a tapped aperture 182. The shelf 180 terminates in a forwardly extending apertured boss 184 to receive a pin 186. The outer ends of the pin 186 are received in the rearwardly extending spaced apart legs 188 and 190 of a support table 192 whereby the pin 186 serves as a pivot point to permit the table 192 to pivot about the pin 186.

Carried on the support shelf 180 is an adjustable jaw mounting plate 194 which is provided intermediate its ends with an oblong adjusting aperture 196. The forward end of the mounting plate 194 is provided with an upstanding block 198 having a forwardly extending lip portion 200, and the block 198 is provided with clearance apertures (not shown) to receive a pair of threaded bolts, which are received in tapped apertures formed in the rearward jaw 202 to affix the jaw 202 to the block 198. The jaw 202 and block 194 are fixed in selected positions of adjustment on the shelf 180 by means of a clamp plate 204, supported on the upper surface of the block 194. The plate 204 is provided with an upstanding cylindrical barrel 206 suitably affixed thereto, and a clamp bolt 208 passes through the barrel 206 and an aperture formed in the plate 204, through the oblong adjusting aperture 196 in the block 194 and into the tapped aperture 182 in the support shelf 180. Accordingly, it will be seen that the block 194 and movable jaw 202 may be moved toward and away from the jaw 142 and affixed in any selected position of adjustment by the clamp bolt 208 and clamp plate 204.

Oscillation of the table or floor 192 is controlled by a cylinder 210 carried between the plates 100 and 102. The cylinder 210 is provided with fittings for the admission of fluid under pressure at its rearward and forward ends, indicated by the reference numerals 212 and 214, respectively, and the cylinder is provided at its rear end with a bracket 216, which is apertured to receive a pivot pin 218, having its ends journalled in the plates 100 and 102. The rod 220 of the cylinder is connected by a pivot pin 222 to two pairs of links 224 and 226 (see FIGURES 4, 5 and 6). The opposite ends of links 224 are connected by a pin 228 to an eye bolt 230, having its threaded stem 231 received in a threaded aperture formed in the spacer plate 104. The links 226 are connected at their opposite ends by pin 232 to a depending hinge eye 234 affixed to the underside of the vise floor 192. As best seen in FIGURES 5 and 6, when the pressure is admitted to the rearward end of the cylinder 210 through fitting 212, the rod 220 is extended to move the floor 192 into its supporting position, as seen in FIGURE 5. When the saw has finished its cut and is moving upward, the admission of fluid under pressure to the forward end of the cylinder 210 through fitting 214 retracts the rod 220, and moves the links 226 and 224 into the position shown in FIGURE 6, thus dropping the table 192 into its discharge position, as shown in FIGURE 6.

The upward travel of the vise floor 192 upon the admission of fluid under pressure to the rear of cylinder 210 is controlled and stopped by the position of a pair of adjusting bolts 240 and 242. As best seen in FIGURE 4 and FIGURE 3, the bolts 240 and 242 are threaded at their upper ends, and are received in threaded apertures 244 formed in the outer extremity of the upper portion of the vise frame side plates 100 and 102, and the bolts are fixed in selected positions of vertical adjustment by means of set screws 246 received in the threaded apertures 244.

It will be understood that the movement of the movable jaw 142 about the pivot pin 132 is effective to clamp and unclamp the bar stock, and the work piece forming portion of the bar stock in the vises 42 and 40, and that such movement is effected and controlled by the operation of the cylinders 158. It will also be understood that the discharge of the cut work piece and the bar end remnant is effected by the movement of the floors of the vises 42 and 40, and that such movement is controlled by the operation of the cylinders 210, which oscillates about its pivot point 218.

Referring to FIGURE 3, it will be seen that the frame plate 88 is provided with a clearance aperture 250 located adjacent the gusset plate 92 to accommodate the movement of the cylinder fitting 212, and a clearance aperture 252, adjacent the gusset plate 94 to accommodate the movement of the cylinder fitting 214. In addition, the vise frame side plate 100 is provided with a clearance aperture 254 through which extends the end of the pivot pin 228, mounted in the eye bolt 230, whereby the pivot pin 288 may be adjusted upwardly, or downwardly depending upon the extent of the threaded engagement between the stem of the eye bolt and the plate 104.

As previously set forth by means of a suitable control system, the vises 40 and 42 are moved axially apart, upon completion of the parting of the work piece to provide a tool relief for the parting tool prior to the upward return movement of the tool. Referring to FIGURES 3, 4, 7 and 8, this action is accomplished by means of a cylinder 260, the pilot of which is received in a counter bore 262 formed in the outer face of the frame plate 100 of the vise 40. The cylinder 260 is affixed to the plate 100 by means of 4 bolts 264, which pass through a flange 265 carried by the cylinder and the bolts 264 are threadedly received in tapped holes formed in plate 100. The counter bore 262 is provided with a central clearance aperture, through which extends the rod 266 of cylinder 260.

Figure 7:
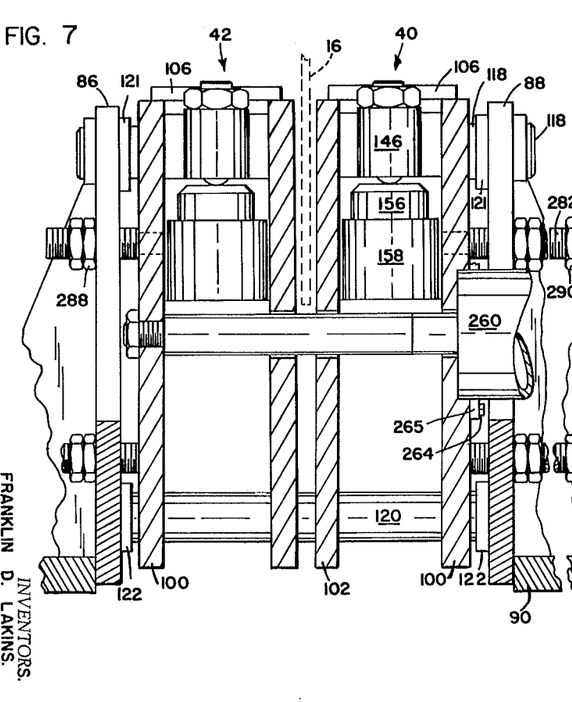
FIGURES 7 and 8 are cross-sectional views taken on the lines 7—7 and 8—8 showing the vises in two different axial positions to provide tool relief.
Figure 8:
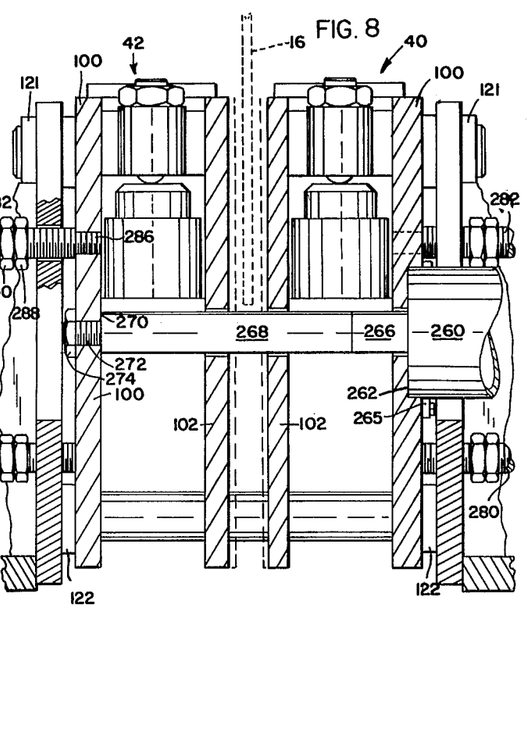

The side plates 102 of vises 40 and 42 are provided with clearance apertures, best seen in FIGURES 7 and 8, through which an extension 268, mounted on the cylinder rod 266 passes. The outer end of the extension 268 is shouldered, as at 270, and is provided with a threaded stub portion 272, which passes through an aperture in the outside plate 100 of vise 42. A nut 274 is affixed to the threaded portion 272 with the shoulder 260 of the extension in abutment with the inner face of the plate 100.

It will be seen, therefore, that the extension 268, and accordingly rod 266, is clamped to the outside plate 100 of vise 40. As previously set forth, vises 40 and 42 are mounted on the slide rods 118 and 120, and as best seen in FIGURE 7 in the normal position, there is a clearance between the outside plates 100 of the vises, and the inner faces of the bushings 121 and 122. Accordingly, when the saw 16, shown in dotted lines in FIGURES 7 and 8, has completed the parting of the work piece from the bar stock, and fluid is admitted to the rearward end of cylinder 260, the vise 42 will first move on the rods 118 and 120 until the outer side plate 100 engages the inner faces of the bushings 121 and 122 carried in plate 86. Thereafter, the vise 40 will move in the opposite direction, or to the right, as viewed in FIGURES 7 and 8, until its outer side plate 100 engages the inner face of the bushings 121 and 122 carried in the frame 88. The extent of this movement is shown in FIGURE 8, wherein the original position of the inner plates 102 is shown in dotted lines, and the relieved position is shown in full lines.

The repositioning of the vises is accomplished by the admission of fluid into the forward end of the tool relief cylinder 260, which moves the vises to the position shown in FIGURE 7 in the same manner. The inward movement of the vises 40 and 42 is controlled by 3 threaded bolts 280, 282, and 284, see FIGURES 3, 7 and 8. Each vise is provided with 3 of these bolts, and each bolt is the same, and is best shown in the upper left portion of FIGURE 8. As seen therein, the bolt 282 is threaded throughout its entire length, and is provided with a threaded stub portion 286 of reduced diameter, which is received in a tapped aperture formed in the vise frame outside plate 100. The outer end of the bolt is provided with a pair of nuts 288 and 290. The nut 290 is a jam nut, while the nut 288 may be adjusted on the bolt, and serves as a stop during the inward movement of the vise frames, when the inner nut 288 engages the outer face of the frames 86 and 88, as is shown in FIGURE 7. Accordingly, by suitable adjustment of the nuts 288 and 290 on the bolts 280, 282 and 284, the amount of inward travel of the vise frames 40 and 42 may be varied.

The entire operation of the clamping apparatus comprising the subject of this invention is actuated by the engagement of the forward end of the bar stock with a work stop 300, see FIGURES 1, 2 and 4. As seen in FIGURE 4, the work stop 300 is provided at its forward end with a hardened portion 302, which is positioned in the path of travel of the bar stock, whereby the portion 302 engages and stops the bar stock as it passes through the vises 42 and 40. The work stop 300 is mounted in a block 304 formed with a cylinder bore 306, and the inner end of the work stop 300 has a rod 308 threadedly attached thereto, and the rod 308 passes through an aperture formed in the inner end of the block 304. A pair of jam nuts 310 are threaded on the outer end of the rod 308, and a compression spring 312 is received in a counter bored portion of the bore 306, between the inner end of the work stop 300 and the inner end of the counter bored portion of bore 306, as best seen in FIGURE 4. Accordingly, the work stop 300 is normally biased by the spring 312 into the position shown in FIGURE 4. When the rod, however, contacts the hardened portion 302, the work stop 300 moves to the right, as seen in FIGURE 4 until the outer end portion of the rod 308 engages the actuator 313 of a limit switch 315 carried by a plate 316 affixed to block 304 by bolts 317. The limit switch may be of the hydraulic or pneumatic type, and is provided with a fitting 318, which connects the switch to a fluid connecting line 320.

The block 304 is provided with a depending leg 322, which is affixed by means of bolts 324 to the upstanding portion 326 of block 328. The block 328 is apertured at 330 to fit on a rod 332, and is clamped in selected positions of adjustment on the rod 332 by means of a pair of bolts 334. As seen in FIGURES 4, 6 and 3, the rod 332 is provided at its inner end with a portion 336 of reduced diameter, which is drilled and tapped to receive the threaded outer end portion of a connecting rod 338. The portion 336 of rod 332 is received in a bushing 340 fixedly mounted in the frame plate 88, and the portion 336 has an axial length greater than that of the bushing 340, whereby the portion 336 may reciprocate in the bushing 340. The rod 338 is provided with a shoulder at 342, and a portion of increased diameter 344 which passes through the plates 100 and 102 of the bar stock vise 42. The outer end of the portion 344 of rod 338 passes through a bushing 346 mounted in the frame plate 86, whereby the portion 344 is free to move in the bushing 346. It will be seen that the shoulder 342 and the inner end of the portion 336 of rod 332 abut the outer faces of the outside plates 102 and 100, respectively, to clamp the rods 332 and 338 to the vise 40 for movement therewith in the bushings 340 and 346, respectively, whereby the entire work stop assembly will move with the vise 40 during the tool relief portion of the cycle.

Figure 9:
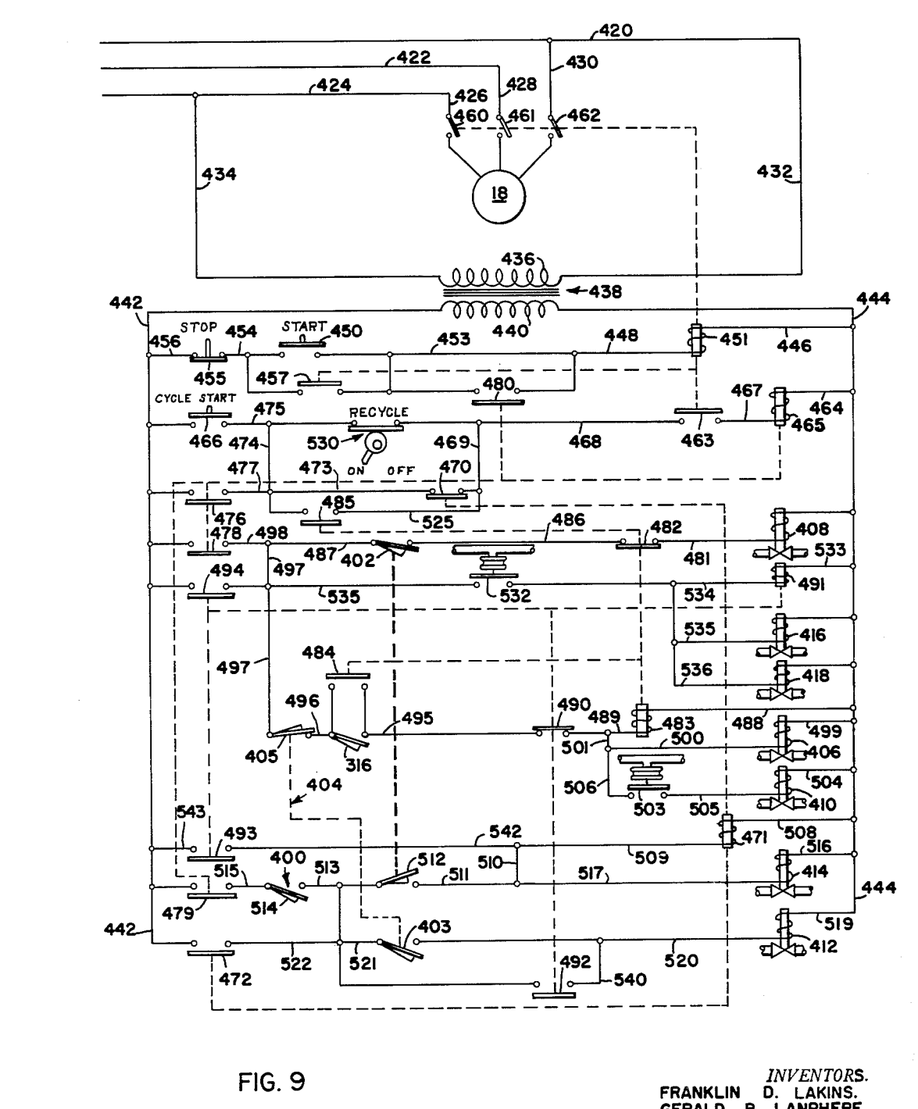
FIGURE 9 is a schematic circuit diagram of the control system.

The control system for operating the apparatus in the manner previously set forth, in a combination electrical and fluid pressure system, and is best seen in FIGURE 9.

The control circuit includes a limit switch 400, having a single set of contacts which are normally open and is closed by the saw arm when it reaches its downwardmost point of travel. A second limit switch 402, having a pair of contacts, is provided, one set of which is normally open, while the other set is normally closed, the respective contacts being operated by the saw when it reaches its upwardmost point of travel. A normally open limit switch 404, having normally open contacts 403, and normally closed contacts 405 is located so as to be closed when the vises are moved apart to provide the tool relief.

The limit switch 316 has a normally open set of contacts located, as previously described, to be closed by the contact of the bar with the work stop.

The circuit is provided with 7 solenoid operated valves, solenoid 406 being operable to open a valve to effect actuation of the clamp cylinder 158 in the piece clamp vise 40, the solenoid 408 being operable to actuate a valve to introduce pressure into the clamp cylinder 158 of the work piece clamp vise 42. Solenoid 410 operates the valve to operate the saw cylinder to control the travel of the saw arm.

Solenoid 412 operates the valve which controls the discharge cylinder 210 to operate the floor 192 in the piece vise 40, while solenoid 414 operates a valve which admits pressure to the forward end of the tool relief cylinder 260, and the rearward end of each of the floor release cylinders 210.

Solenoid 416 operates a valve which controls the admission of pressure to the forward end of the discharge cylinder 210 in the bar clamp vise 42 so as to permit the oscillation of the floor 192 of that vise to permit discharge of the bar end remnant when all of the good pieces of bar stock have been parted from the bar.

Solenoid 418 operates a valve which serves to block the operation of the tool relief cylinder 260.

Referring to the FIGURE 9, it will be seen that a three-phase A.C. power supply comprising lines 420, 422 and 424 are connected to the 3 legs 426, 428 and 430 of a three-phase motor 18, which drives the saw 16. The legs 420 and 424 are tapped by lines 432 and 434 and are connected to the primary 436 of a transformer 438. The secondary 440 of the transformer has the lines 442 and 444 connected thereto, and the line 444 may be considered the hot line, while the line 442 is the common, or return line for purposes of description of the operation of the circuit.

Connected across the lines 442 and 444 is a master starting switch 450. Closure of the starting switch 450 completes a circuit from the hot line 444 through line 446, relay coil 451, line 448, line 453, closed contacts of switch 450, line 454, normally closed contacts of a stop switch 455, and line 456 to the common line 442. The closure of the switch 450 thus energizes relay 451 closing contacts 457 and contacts 460, 461 and 462 in the 3 legs 426, 428 and 430 which supply power to the motor 18, thus starting the motor 18.

The energization of the relay 451 also closes the contacts 463 connecting the hot line 444 by line 464 through the coil of relay 465 to line 467, through closed contacts 463, line 468, line 469, through the normally closed contacts 470 of relay 471, also having contacts 472 which are normally open, line 473, line 474, line 475 through the cycle start switch 466 to the common line 442. Accordingly, the circuit is completed by closure of the cycle start switch 466.

Closure of switch 466 also energizes relay 465, closing the contacts 476, which serves to connect the line 477 to the line 473 of the circuit just described, thus providing a holding circuit for the relay 465 to maintain it in the energized condition. In addition the energization of relay 465 closes the normal open contacts 478, 479 and 480 for a purpose hereinafter described.

The closure of the contacts 478 completes a circuit through the coil of solenoid 408 from the hot line 444 by line 481, normally closed contacts 482 of relay 483, which also has normally open contacts 484 and 485, and from the closed contacts 482 by line 486 through the normally closed contacts of limit switch 402 to line 487 and through the closed contacts 478 of energized relay 465 to the common line 432. The energization of the solenoid 408 operates its associated valve to permit exit of fluid under pressure from the cylinder 158 of the bar vise 42, whereby its movable jaw is unclamped by the action of the spring 172 (see FIGURE 5).

The bar feed mechanism now feeds the bar stock through the now open bar vise 42 and the normally open piece vise 40, and into engagement with the work stop, thus operating the limit switch 316 closing the normally open contacts. The closure of the contacts of limit switch 316 completes a circuit from the hot line 444, through the coil of relay 483 by lines 488, 489, normally closed contacts 490 of relay 491, also having normally open contacts 492, 493, 494, line 495, through the now closed limit switch 316, line 496 through the normally closed contacts 405 of limit switch 404, line 497 through the now closed contacts 478 in line 498 of energized relay 465, all whereby relay 483 is energized.

The energization of the relay 483 operates solenoid 406 by completing a circuit from the hot line 444, through lines 499 and 500, which is connected into the closed circuit just described, by line 501, which connects to the line 489. The operation of the solenoid 406, as previously described, serves to actuate its associate valve so as to operate the cylinder 158 in the piece vise 40, so as to clamp the work forming portion of the bar stock in the vise 40. In addition, the energization of the relay 483 opens the contacts 482 to de-energize the solenoid 408.

The de-energization of the solenoid 408 in turn operates its associated valve so as to cause fluid under pressure to enter the cylinder 158 in the bar vise 42, thus causing the movable jaw to be moved into the clamping position to clamp the bar stock.

The pressure in the cylinder 158 of the piece vise 40 is sensed, and operates a pressure switch 503, closing the switch to complete a circuit from the hot line 444, through line 504, solenoid 410, line 505, closed switch 503 to line 506, which is connected to line 501, which in turn is connected to the closed circuit previously described, thus energizing the solenoid 410. The energization of the solenoid 410 operates its associated valve to cause the saw arm cylinder to operate to start the downward travel of the saw arm to effect the parting operation. As the saw arm begins to move downward, normally closed contacts of limit switch 402 are opened, thus opening the circuit holding solenoid 408 energized, thereby de-energizing the solenoid 408. The de-energization of solenoid 408 operates its associated valve to introduce pressure into clamp vise 158 in bar vise 42, thus clamping the bar stock.

Upon completion of the downward travel of the saw arm to effect the separation of the work piece, the limit switch 400 is closed, completing a circuit from the hot line 444, through line 508, coil of relay 471, line 509, line 510, line 511, through the now closed contacts 512 of limit switch 402, line 513, through the closed contacts 514 of limit switch 400, line 515, through the closed contacts 479 of energized relay 465. The closure of contacts 512 of limit switch 402 completes a circuit from the hot line 444, through line 516, solenoid 414 and line 517, which is connected to line 511 of the circuit just described, to energize the solenoid 414. The energization of the solenoid 414 actuates its associated valve to operate the tool relief cylinder 260 as previously described, to separate the vises 40 and 42 to provide for tool relief prior to the upward return movement of the saw. The movement of the vises 40 and 42 closes the normally open contacts 403 of limit switch 404, as previously described, completing a circuit through the coil of solenoid 412 by lines 519, 520, through closed contacts 403, line 521, which is connected by line 522 through the closed contacts 472 of the energized relay 471 to the common side 442.

The energization of the relay 471 and limit switch 404 therefore serves to energize the solenoid 412, which, as previously set forth, operates the valve associated therewith to feed fluid under pressure to the forward end of the floor cylinder 210 of the piece vise 40, thus moving the floor 192 to the discharge position. The operation of the limit switch 404 also opens the contacts 405 opening the circuit previously described, holding the relay 483 energized, thus in turn de-energizing the solenoids 406 and 410, which actuates the valves associated therewith to evacuate the fluid under pressure from the cylinder 158 to unclamp the jaw, and discharge the work piece. Prior to this, however, the de-energization of the solenoid 410 operates the saw arm cylinder control valve which supplies pressure to the saw arm cylinder so as to return the saw arm to its upper position. After the saw reaches its upper position, the contacts of limit switch 400 are opened, and the normally closed contacts of limit switch 402 are closed, while the normally open contacts 512 are opened. The closure of the normally closed contacts of limit switch 402 by the saw arm in its upper position serves to energize solenoid 408 to unclamp the bar stock for the next cycle.

The energization of the relay 471 opens the contacts 470 in the holding circuit for relay 465, but the previous energization of the relay 483 closes the contacts 485, establishing through line 525, an alternate holding circuit to maintain the relay 465 energized. The operation of the limit switch 404 by the tool relief motion serves to open contacts 405, opening the circuit to the relay 483, thus de-energizing this relay thereby opening the contacts 485 to de-energize the relay 465, unless a recycle selector switch 530 is on the "on" position. If, however, the recycle selector switch 530 is off, the circuit through line 468 is opened, and upon the opening of the contacts 470 of relays 471 and contacts 485 of relay 483, the cycle is completed.

The relay 471 is maintained energized and the solenoids 414 and 412 are maintained energized through the closed contacts 472 of relay 471, however, so that the cut piece can drop, and these solenoids and the relay 471 are so maintained in the energized condition until the saw reaches its uppermost point to operate the limit switch 402. If at this point, the recycle selector switch 530 is in the "on" position, the holding circuit for the relay 465 remains closed, and the opening of normally closed contacts of switch 402 by the saw arm in its uppermost position de-energizes solenoid 408 to operate its associated valve so as to evacuate the fluid under pressure from the cylinder 158 of vise 42, thus unclamping the stock bar and the cycle continues in the manner just set forth.

Accordingly, if the recycle switch 530 is turned off during any cycle, the cycle will be completed and will then stop.

When the bar feed machine has thus fed the bar stock intermittently into the clamping device, and all of the good work pieces have been parted therefrom, a signal from the position of the bar feed mechanism operates a pressure switch 532 to complete a circuit from the hot line 444 through line 533, and the coil of relay 491, line 534, closed pressure switch 532, line 535, line 497, line 498, closed contacts 478 of energized relay 465 to the common line 442, thus energizing the relay 491. The energization of the relay 491 closes the contacts 492, 493, and 494. Closure of these contacts energizes the solenoids 408, 416 and 418. The solenoid 408 is energized through the circuit previously described, and solenoids 416 and 418, which are connected by lines 535 and 536, through the coils of these solenoids from the hot side 444 to the line 534 and through the closed contacts 494. Closure of the contacts 492 completes an alternate circuit for the energization of solenoid 412, which circuit comprises hot line 444, line 519, line 520, line 540, line 522, through the closed contacts 472 of energized relay 471 to the common line 442. Relay 471 is energized upon the closure of the contact 493 of relay 491 by connecting the hot line 444 by line 508 through the coil of relay 471 to line 509, which is connected by line 542 through the closed contacts 493 of energized relay 491 to line 543, which is connected to the common line 442. The energization of the solenoid 418 and the solenoid 412 causes the vise floors 192 in both the vises 40 and 42 to drop, and the energization of the solenoids 406 and 408 causes the clamp cylinders 158 in both vises to be exhausted causing the bar end remnant to be discharged. The return movement of the bar feed pusher mechanism opens the pressure switch 532 to de-energize the relay 491 and solenoids 416 and 418.

If at this point, the recycle selector switch 530 is off, the relay 465 is de-energized upon energization of the relay 471, due to the opening of the normally closed contacts 470. The bar is therefore fed against the closed bar vise, and the cycle ends. If, however, the reset cycle selector switch 530 is on, the relay 465 remains energized. Accordingly, when the pressure switch 532 is open, the relay 491 is de-energized, but solenoid 408 remains energized through the closed contacts 478 of energized relay 465, thus maintaining the bar vise in the open or unclamped position. The bar stock is therefore advanced into the engagement with the work stop, thus operating limit switch 316, and the cycle continues, as previously set forth.

The circuit is provided with suitable over-current protection in case of jamming, or the like, which will open the relays 451 and 465, and all associated circuits, de-energizing the saw motor, and return the saw arm to its uppermost position.

The pressure portion of the control system has not been shown, as the appropriate connections can be made by any artisan, and it comprises no part of this invention.

What we claim is:

1. A work clamp of the character described comprising a pair of closely spaced vises, each of said vises comprising a fixed jaw and a movable jaw, and a pivotally mounted support table for initially supporting said work in said vises between said jaws, said work being clamped by said jaws to hold said work during the parting of the forward portion of said work by a parting tool moving in the space between said vises, means for moving said vises apart upon completion of the parting of said work to effect tool relief for said parting tool, and means for opening the vise gripping the separated workpiece and oscillating the support table in said vise to discharge said part.

2. In a bar feeding and cutoff set-up including a bar feed machine for feeding bar stock into a cutoff machine and a cutoff machine having a cutting tool for parting the forward portion of said bar stock to form a workpiece, said bar feeding and cutoff operations occurring in timed sequence to continuously form workpieces of a uniform predetermined length, the improvement comprising clamp means for fixedly gripping the bar stock and workpiece portion of the bar stock adjacent said cutting tool, said clamp means being operable to axially separate said workpiece and bar stock upon completion of the cutting operation to provide tool relief for the return movement of said cutting tool and means for releasing and discharging said workpiece.

3. The invention of claim 2, wherein said clamp means is further provided with means for opening said clamp means subsequent to the release and discharge of said workpiece and means operable to reset said clamp means to eliminate said tool relief spacing, all whereby said clamp means is free to receive additional in-feed of said bar stock.

4. In bar feeding and bar working machine set-up, said bar working machine having a parting tool for parting the forward portion of bar stock fed into said bar working machine by said bar feeding machine in timed sequence with the operation of said parting tool to continuously form workpieces of uniform characteristics, the improvement comprising clamp means including first and second gripping means, each of said gripping means including a pivotally mounted support member, a fixed jaw and a movable jaw adjacent said support member for clamping said bar stock on said support member, said first gripping means positioned to clamp said bar on one side of said parting tool, said second gripping means positioned to clamp said bar stock on the workpiece forming portion thereof on the other side of said parting tool and said first and second gripping means being spaced apart to provide a parting tool pathway, and means for releasing said second gripping means upon completion of the parting of said workpiece and means for oscillating said support member to discharge said workpiece, and tool relief means for moving said first and second gripping means axially apart to provide tool relief for said parting tool.

References Cited by the Examiner

UNITED STATES PATENTS

| 1,219,935 | 3/1917 | Gorton | 83—452 X |
| 2,397,192 | 3/1946 | Meyerbach | 83—157 |
| 2,663,330 | 12/1953 | Hill | 143—46 |
| 2,729,879 | 1/1956 | Sampson | 83—375 X |
| 3,066,564 | 12/1962 | Carpenter | 83—460 X |

FOREIGN PATENTS 770,534   3/1957   Great Britain.

WILLIAM W. DYER, Jr., *Primary Examiner.*

WILLIAM S. LAWSON, *Examiner.*